US012675860B2

(12) United States Patent
Wakim et al.

(10) Patent No.: US 12,675,860 B2
(45) Date of Patent: *Jul. 7, 2026

(54) COMPUTERIZED IMAGE ANALYSIS FOR AUTOMATICALLY DETERMINING WAIT TIMES FOR A QUEUE AREA

(71) Applicant: The Toronto-Dominion Bank, Toronto (CA)

(72) Inventors: Matta Wakim, Petersburg (CA); Dexter Lamont Fichuk, Kitchener (CA); Sophia Dhrolia, Toronto (CA); Christopher Michael Dulhanty, Waterloo (CA)

(73) Assignee: The Toronto-Dominion Bank, Toronto (CA)

( * ) Notice: Subject to any disclaimer, the term of this patent is extended or adjusted under 35 U.S.C. 154(b) by 406 days.

This patent is subject to a terminal disclaimer.

(21) Appl. No.: 18/327,955

(22) Filed: Jun. 2, 2023

(65) Prior Publication Data

US 2023/0316485 A1 Oct. 5, 2023

Related U.S. Application Data

(63) Continuation of application No. 16/150,696, filed on Oct. 3, 2018, now Pat. No. 11,704,782.

(51) Int. Cl.
*G06T 7/70* (2017.01)
*G06Q 10/06* (2023.01)
(Continued)

(52) U.S. Cl.
CPC ........... *G06T 7/0002* (2013.01); *G06Q 10/06* (2013.01); *G06Q 30/016* (2013.01);
(Continued)

(58) Field of Classification Search
CPC .. G06Q 10/02; G06Q 30/0205; G06T 7/0002; G06T 7/70; G06T 2207/10016; G06T 2207/30242
See application file for complete search history.

(56) References Cited

U.S. PATENT DOCUMENTS 5,953,055 A * 9/1999 Huang ................... H04N 7/188
348/149
6,263,088 B1 * 7/2001 Crabtree ................. G06T 7/246
382/104

(Continued)

FOREIGN PATENT DOCUMENTS

CA 2627051 A1 * 7/2008 ............. G07C 11/00
CN 105139040 A * 12/2015 .......... G06V 40/103
JP H10143715 A * 5/1998

OTHER PUBLICATIONS

Redmon et al.: "YOLO9000: Better, Faster, Stronger", available from https://arxiv.org/pdf/1612.08242.pdf, dated Dec. 25, 2016.*
(Continued)

*Primary Examiner* — Amandeep Saini
*Assistant Examiner* — Jaspreet Kaur
(74) *Attorney, Agent, or Firm* — Rowand LLP

(57) ABSTRACT

A computer-implemented method allows a wait time to be determined automatically for a queue area. A series of images showing the environment are received over time. A wait time associated with the queue area is determined by detecting a location of a object corresponding to a person in a first one of the images; associating the object with an identifier uniquely identifying the object in the first one of the images matching objects in later images; and determining the wait time based on times associated with an image in which an object associated with the identifier enters the queue area through the defined entrance area and later one of the images in which an object associated with the iden- (Continued)

tifier exits the queue area through the defined exit area. An indication of the wait time is output. Machine learning may be used to extract features of an object from an image.

20 Claims, 10 Drawing Sheets

(51) Int. Cl.

| | |
|---|---|
| *G06Q 30/016* | (2023.01) |
| *G06Q 30/0204* | (2023.01) |
| *G06T 7/00* | (2017.01) |
| *G06V 20/52* | (2022.01) |

(52) U.S. Cl.
CPC ......... *G06Q 30/0205* (2013.01); *G06V 20/52* (2022.01); *G06T 7/70* (2017.01); *G06T 2207/10016* (2013.01); *G06T 2207/30196* (2013.01); *G06T 2207/30242* (2013.01)

(56) References Cited

U.S. PATENT DOCUMENTS

| | | | |
|---|---|---|---|
| 6,654,047 | B2 | 11/2003 | Iizaka |
| 6,829,583 | B1 | 12/2004 | Knapp et al. |
| 8,224,028 | B1 | 7/2012 | Golan et al. |
| 8,527,575 | B2 | 9/2013 | Xiao et al. |
| 9,124,778 | B1 * | 9/2015 | Crabtree .......... G08B 13/19671 |
| 10,606,668 | B2 | 3/2020 | Snell et al. |
| 10,673,784 | B1 | 6/2020 | Perez Rodreguez et al. |
| 2005/0198107 | A1 | 9/2005 | Cuhls et al. |
| 2007/0003141 | A1 | 1/2007 | Rittscher et al. |
| 2009/0249342 | A1 * | 10/2009 | Johnson ................. G06Q 10/04 |
| | | | 718/101 |
| 2009/0268028 | A1 | 10/2009 | Ikumi et al. |
| 2009/0313062 | A1 | 12/2009 | Natsuyama et al. |
| 2010/0004997 | A1 | 1/2010 | Mehta et al. |
| 2011/0231419 | A1 | 9/2011 | Papke et al. |
| 2014/0267738 | A1 | 9/2014 | Allen et al. |
| 2015/0058049 | A1 | 2/2015 | Shaw |
| 2015/0095107 | A1 | 4/2015 | Matsumoto et al. |
| 2015/0120237 | A1 | 4/2015 | Gouda et al. |
| 2015/0134418 | A1 | 5/2015 | Leow et al. |
| 2015/0169954 | A1 | 6/2015 | Schlattmann et al. |
| 2015/0278608 | A1 | 10/2015 | Matsumoto et al. |
| 2016/0005053 | A1 | 1/2016 | Klima et al. |
| 2016/0180173 | A1 * | 6/2016 | Westmacott .......... G07F 19/207 |
| | | | 382/103 |
| 2016/0191865 | A1 | 6/2016 | Beiser et al. |
| 2016/0224844 | A1 * | 8/2016 | Gyger .................... G06V 20/53 |
| 2016/0224845 | A1 | 8/2016 | Gyger et al. |
| 2016/0292514 | A1 * | 10/2016 | Robinson ............. G06V 10/762 |
| 2017/0070707 | A1 * | 3/2017 | Winter ................. G06V 20/176 |
| 2017/0083831 | A1 | 3/2017 | Ghosh et al. |
| 2017/0098337 | A1 | 4/2017 | Galley et al. |
| 2017/0277956 | A1 | 9/2017 | Winter et al. |
| 2017/0277959 | A1 | 9/2017 | Winter et al. |
| 2018/0061081 | A1 | 3/2018 | Nagao et al. |
| 2018/0061161 | A1 * | 3/2018 | Nagao .................... G06Q 10/04 |
| 2018/0129984 | A1 | 5/2018 | Polk et al. |
| 2018/0260864 | A1 | 9/2018 | Leclercq et al. |
| 2018/0330285 | A1 | 11/2018 | Nagao |
| 2019/0026565 | A1 | 1/2019 | Ikegami |
| 2019/0080178 | A1 | 3/2019 | To et al. |
| 2019/0332856 | A1 | 10/2019 | Sato et al. |
| 2019/0370976 | A1 | 12/2019 | Oya |
| 2020/0134323 | A1 | 4/2020 | Dami |
| 2021/0110167 | A1 | 4/2021 | Ogawa |

OTHER PUBLICATIONS

Previtali, F., Bloisi, D.D. & Iocchi, L. A distributed approach for real-time multi-camera multiple object tracking. Machine Vision and Applications 28, 421-430 (2017). https://doi.org/10.1007/s00138-017-0827-5 (Year: 2017).*

Girshick: "Fast R-CNN", available from https://arxiv.org/pdf/1504.08083.pdf, dated Apr. 27, 2015.

Ren et al.: "Faster R-CNN: Towards Real-Time Object Detection with Regional Proposal Networks", available from https://arxiv.org/pdf/1506.01497.pdf, dated Jan. 6, 2016.

Liu et al.: "SSD: Single Shot MultiBox Detector", available from https://arxiv.org/pdf/1512.02325.pdf, dated Dec. 29, 2016.

Wojke et al.: "Simple Online and Realtime Tracking with a Deep Association Metric", available from https://arxiv.org/pdf/1703.07402.pdf, dated Mar. 21, 2017.

Peleshko et al.: "Design and implementation of visitors queue density analysis and registration method for retail video surveillance purposes", http:ieeexplore.ieee.org/stamp/stamp.jsp?arnumber= 7583531, year 2016.

* cited by examiner

800

900

Start

Detect Object Corresponding
to a Person
910

Associate Object with an
Identifier
920

Determine Wait Time Based on
Times Associated With Images
Including Matching Objects
930

Stop

1000

1010       1012       1014

COMPUTERIZED IMAGE ANALYSIS FOR AUTOMATICALLY DETERMINING WAIT TIMES FOR A QUEUE AREA

CROSS-REFERENCE TO RELATED APPLICATIONS

This application is a continuation of U.S. patent application Ser. No. 16/150,696 entitled "COMPUTERIZED IMAGE ANALYSIS FOR AUTOMATICALLY DETER-MINING WAIT TIMES FOR A QUEUE AREA", filed on Oct. 3, 2018, the contents of which are herein incorporated by reference in their entirety.

TECHNICAL FIELD

The present application relates to automated image analysis, and, more particularly, to computerized analysis of images including a queue area to automatically determine wait times for that queue area.

BACKGROUND

In various environments, people may queue or "line-up". For example, in many businesses, customers may wait in a line to interact with a service person or to use a terminal or kiosk. In a particular example, a customer may wait to receive service from a bank teller or to use an automated teller machine (ATM).

Depending on volumes, wait times in lines may ebb and flow. For example, if the volume of customers is higher and/or a customer ahead in line has a complex matter, the line and/or wait times may grow. By contrast, if fewer people arrive to wait in line and/or if the transactions people are waiting to perform are simple, then the line may shrink and/or wait times may lessen.

BRIEF DESCRIPTION OF THE DRAWINGS

Embodiments are described in detail below, with refer-ence to the following drawings.

Like reference numerals are used in the drawings to denote like elements and features.

DETAILED DESCRIPTION OF VARIOUS EMBODIMENTS

Figure 1:
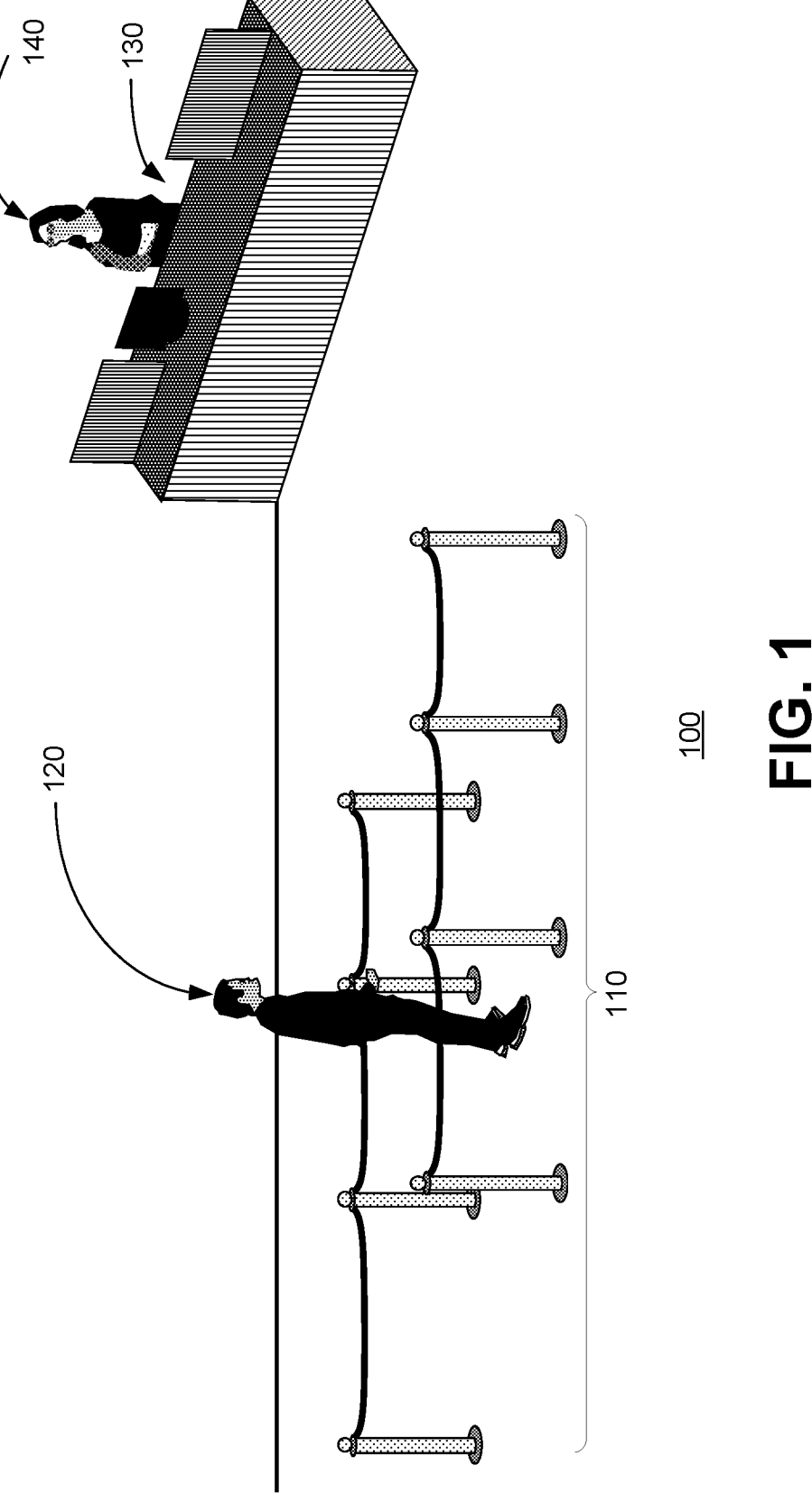
FIG. 1 is a perspective view of an example environment with respect to which the subject matter of the present application may be employed.

According to the subject matter of the present application, there may be provided a computer system. The computer system may include a processor and a memory module coupled to the processor. The memory may store instruc-tions, that when executed by the processor, cause the com-puter system to receive signals corresponding to a series of images showing an environment over time. The environ-ment may include a queue area having a defined entrance area and a defined exit area. The instructions may further cause the computer system to determine a wait time asso-ciated with the queue area. The wait time for the queue may be determined by detecting, in a first one of the images, a location of a first object corresponding to a person; associ-ating the first object with an identifier, the identifier uniquely identifying the first object in the first one of the images and objects matching the first object in later ones of the images; and determining the wait time for the person based on times associated with a second one of the images in which a second object associated with the identifier enters the queue area through the defined entrance area and a third, later one of the images in which a third object associated with the identifier exits the queue area through the defined exit area. The instructions may further cause the computer system to, after the wait time associated with the queue area is deter-mined, output an indication of the wait time for the person.

Put differently, at least one person is detected in a series of images such as, for example, from a video feed, the identity of the person is persisted across sequential images (which may be referred to as frames), and based on the foregoing, the time that the person waits in a queue may be determined automatically.

Conveniently, in this way, a wait time associated with queuing an environment may be automatically determined and monitored, potentially in real time or near-real time.

The series of images may further show a service area over time. It may be that the instructions, when executed by the processor, further cause the computer system to: identify a fourth one of the images in which a fourth object associated with the identifier enters the service area and a fifth, later one of the images in which a fifth object associated with the identifier exits the service area; and determine a service time for the person based on times associated with the fourth and fifth ones of the images; and output an indication of the service time for the person.

It may be that a transaction processing system stores transactions associated with providing service in the service area. Each of the transactions may have a time and an associated account. The instructions, when executed by the processor, may further cause the computer system to asso-ciate at least one of the wait time and the service time for the person with an account based on ones of the transactions having a time falling within a time window defined by the times associated with third and fourth images. The instruc-tions, when executed by the processor, may further cause the computer system to determine that the ones of the transac-tions having a time falling within the time window are associated with providing a service that could have been accessed by the person through a different channel that does not require waiting in the queue area for service; and provide an indication to a contact associated with the account suggesting use of the different channel to avoid waiting for the service in future. Additionally or alternatively, it may be that the instructions, when executed by the processor, further cause the computer system to determine an average visit time for accounts of a particular type during a defined period based on wait times and service times associated with accounts associated with transactions associated with providing service in the service area during the defined period.

It may be that the instructions, when executed by the processor, further cause the computer system to determine wait times for a group of people entering and exiting the queue area during a defined period, the people in the group corresponding to respective identifiers associated with objects entering the queue area through the defined entrance area during the defined period and exiting the queue area through the defined exit area during the defined period; calculate an average wait time for the defined period based on the wait times for the group of people; and output an indication of the average wait time for the defined period.

It may be that the instructions, when executed by the processor, further cause the computer system to determine service times for a second group of people entering and exiting a service area during the defined period, the people in the second group corresponding to respective identifiers associated with objects entering and exiting the service area during the defined period; calculate an average service time for the defined period based on the service times for the second group of people; and output an indication of the average service time for the defined period.

It may be that the instructions, when executed by the processor, further cause the computer system to determine a current visit time based on the average wait time for the defined period and the average service time for the defined period; and output an indication of the current visit time associated with a location of the environment.

It may be that the environment further includes one or more additional service areas. The instructions, when executed by the processor, may further cause the computer system to determine service times for a third group of people, the people in the third group corresponding to respective identifiers associated with objects entering and exiting the additional service areas during the defined period. The average service time for the defined period may be further based on the additional service times.

The instructions, when executed by the processor, may further cause the computer system to detect that the current visit time has exceeded a threshold and send an indication that the one of the additional service areas should be opened to reduce wait times.

According to the subject matter of the present application, there may be provided a computer-implemented method comprising: receiving signals corresponding to a series of images showing an environment over time, the environment including a queue area having a defined entrance area and a defined exit area; and determining a wait time associated with the queue area by: detecting, in a first one of the images, a location of a first object corresponding to a person; associating the first object with an identifier, the identifier uniquely identifying the first object in the first one of the images and objects matching the first object in later ones of the images; and determining the wait time for the person based on times associated with a second one of the images in which a second object associated with the identifier enters the queue area through the defined entrance area and a third, later one of the images in which a third object associated with the identifier exits the queue area through the defined exit area. The method may further include, after the wait time associated with the queue area is determined, outputting an indication of the wait time for the person.

According to the subject matter of the present application, there may be provided a non-transitory computer-readable storage medium storing instructions that, when executed by a processor of a computing device cause the computing device to: receive signals corresponding to a series of images showing an environment over time, the environment including a queue area having a defined entrance area and a defined exit area; and determine a wait time associated with the queue area. The wait time associated with the queue area may be determined by detecting, in a first one of the images, a location of a first object corresponding to a person; associating the first object with an identifier, the identifier uniquely identifying the first object in the first one of the images and objects matching the first object in later ones of the images; and determining the wait time for the person based on times associated with a second one of the images in which a second object associated with the identifier enters the queue area through the defined entrance area and a third, later one of the images in which a third object associated with the identifier exits the queue area through the defined exit area. The instructions may further cause to computer device to, after the wait time associated with the queue area is determined, output an indication of the wait time for the person.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a perspective view of an example environment 100 with respect to which the subject matter of the present application may be employed.

As illustrated, the example environment 100 includes a queue area 110. Customers may wait in the queue area 110. For example, as illustrated, a person 120 waits in the queue area 110.

The example environment also includes a service position 130, specifically a wicket, at which a customer may receive service from a service person 140. For example, where the example environment 100 corresponds to a bank branch, the person 120 may correspond to a customer awaiting service and the service person 140 may be a bank teller. In other embodiments, the service position 130 may be a location where a customer may receive service from a machine. Additionally or alternatively, a machine or service person may provide service other than at a wicket. For example, a machine may be freestanding or mounted in a wall. In another example, a service person may be at a check stand or, potentially, standing alone (e.g., at a designated position). For example, where the environment is a bank branch, the service person 140 could be replaced by an automated teller machine.

In some embodiments, the queue area may be demarcated physically such, as, for example, by ropes as shown in FIG.

1. Alternatively, it may be that the queue area is not physically defined but is expected to be in a particular portion of the example environment 100 such as, for example, due to the location of the service position 130, where people enter the example environment 100, positions of architectural obstructions (not shown) and/or furniture (not shown), etc.

As further described below, the example environment 100 may be monitored according to the subject matter of the present application in order to determine a wait time associated with waiting in the queue area 110.

Figure 2:
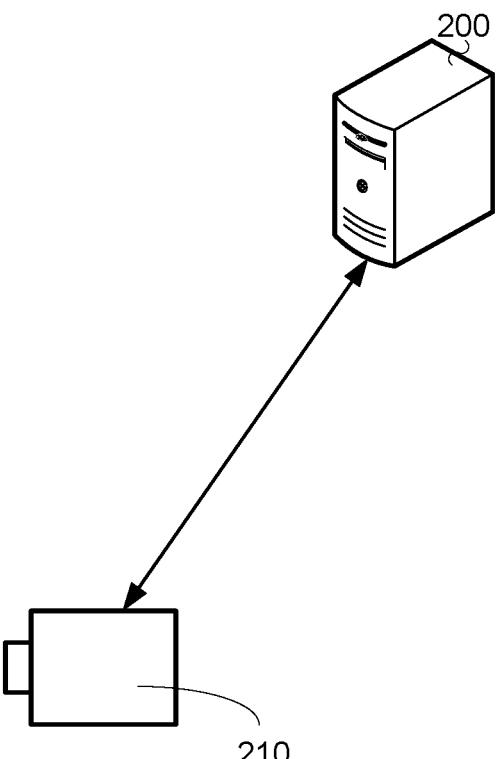
FIG. 2 is a schematic diagram illustrating an operating environment of an example embodiment.

FIG. 2 is a schematic diagram illustrating an operating environment of an example embodiment.

As illustrated, a computer system 200 is in communication with a camera 210.

The computer system 200 is a computing device as is described in greater detail below.

The camera 210 captures images showing the example environment 100 (FIG. 1). The camera 210 may incorporate a digital image sensor system as, for example, a charge coupled device (CCD) or a complementary metal-oxide-semiconductor (CMOS) image sensor. The camera 210 may communicate with the computer system 200 via a network (not shown). For example, the camera 210 may be a so-called IP (Internet Protocol) camera and may communicate with the computer system 200 by way of a Transmission Control Protocol/Internet Protocol (TCP/IP) network such as, for example, the Internet. In some embodiments, the camera 210 may capture images for more than one purpose. For example, the camera 210 could also be used as a security camera.

As further described below, the computer system 200 is configured to process images from the camera 210 showing the example environment 100 (FIG. 1) over time in order to (potentially amongst other things) determine a wait time associated with the queue area 110.

Figure 3:
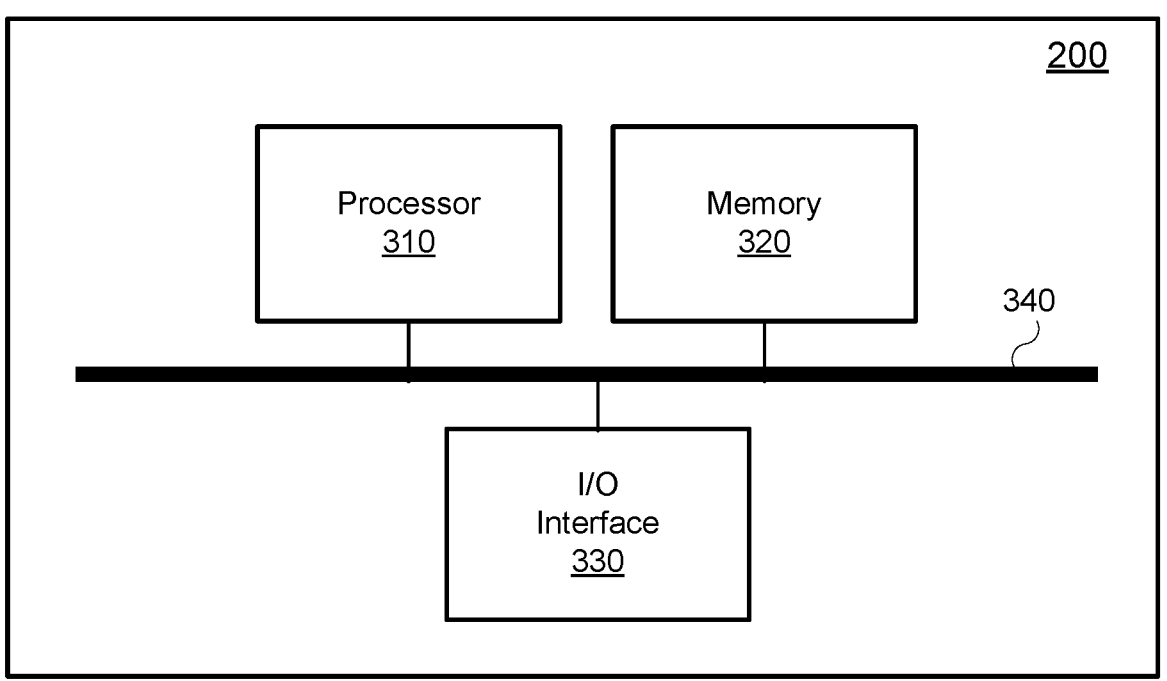
FIG. 3 is a high-level operation diagram of a computing device.

FIG. 3 is a high-level operation diagram of the computer system 200.

As illustrated, the computer system 200 includes a variety of modules. For example, as illustrated, the computer system 200 may include a processor 310, a memory 320, and/or an I/O interface 330. As illustrated, the foregoing example modules of the computer system 200 are in communication over a bus 340.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The I/O interface 330 is an input/output module. The I/O interface 330 allows the computer system 200 to receive input from and/or to provide input to components of the computer system 200 and/or to/from one or more additional modules and/or peripherals. For example, the computer system 200 may interface with the camera 210 (FIG. 2) by way of the I/O interface 330 such as, for example, to receive the above-mentioned images of the example environment 100 (FIG. 1).

In some embodiments, the I/O interface 330 may be or may interface with a communications module (not shown).

In other embodiments, a communications module may be in communication via the bus 340 directly. A communications module may allow the computer system 200 to communicate with other computing devices and/or various communications networks. Put differently, a communications module may allow the computer system 200 to send or receive communications signals. Communications signals may be sent or received according to one or more protocols or according to one or more standards. For example, a communications module may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, a communications module may allow the computer system 200 to communicate using near-field communication (NFC), via Wi-Fi™, using Bluetooth™ or via some combination of one or more networks or protocols.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
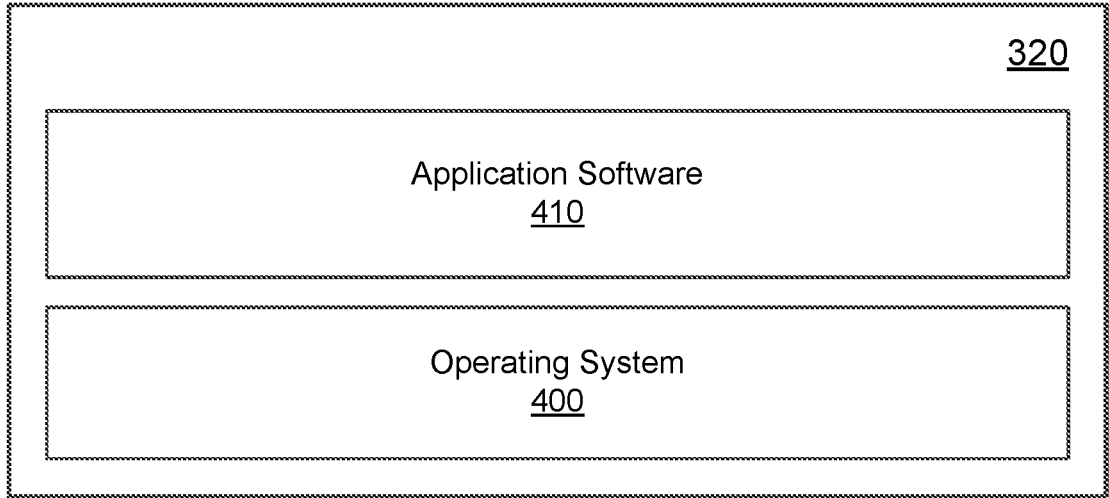
FIG. 4 shows a simplified organization of software com-ponents stored in a memory of the computing device of FIG. 3.

FIG. 4 depicts a simplified organization of software components stored in the memory 320 of the computer system 200. As illustrated, these software components include an operating system 400 and an application software 410.

The operating system 400 is software. The operating system 400 allows the application software 410 to access the processor 310 (FIG. 3), the memory 320, and the I/O interface 330 of the computer system 200. The operating system 400 may be, for example, Google™ Android™, Apple™ iOS™, UNIX™, Linux™, Microsoft™ Windows™, Apple OSX™ or the like.

The application software 410 is software. The application software 410 adapts the computer system 200, in combination with the operating system 400, to operate as a device for (potentially amongst other things) automatically determining wait times for a queue area.

Figure 5:
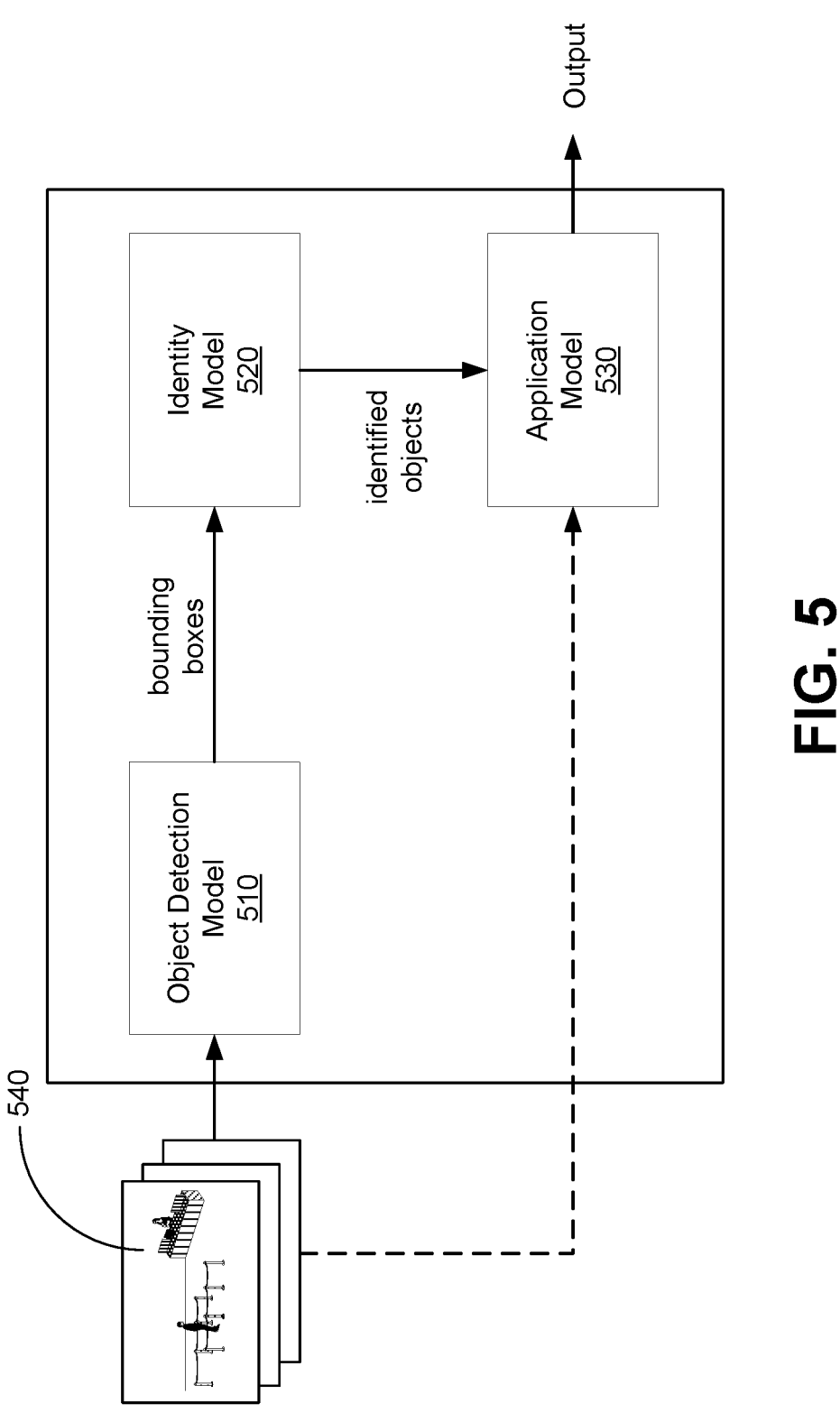
FIG. 5 is a schematic diagram showing modules of a software application for determining wait times.

FIG. 5 is a schematic diagram showing modules of the application software 410.

As illustrated, the application software 410 includes an object detection model 510, an identity model 520, and an application model 530. Each of the object detection model 510, the identity model 520, and the application model 530 is, at least conceptually, a component of the application software 410. Additionally, it may be that, in some embodiments, one or more of the object detection model 510, the identity model 520, and the application model 530 corresponds to a module or component in the implementation of the application software 410 within the meaning of one or more programming languages or other software tools as may be employed in implementing the application software 410.

As mentioned above, a series of images 540 of the example environment 100 (FIG. 1) are received by the computer system 200 (FIG. 2) from the camera 210. The series of images 540 may correspond to a particular, fixed vantage point in the example environment 100 such as, for example, the vantage point depicted in FIG. 1. Alternatively, the series of images 540 may be from another vantage point such as, for example, a side-elevation view or a plan (top-down) view.

The object detection model 510 is responsible for detecting objects in images of the series of images 540. More particularly, the output of the object detection model 510 is a series of bounding boxes defining the locations of objects, in particular locations of objects predicted to correspond to a person, in an image.

Figure 6:
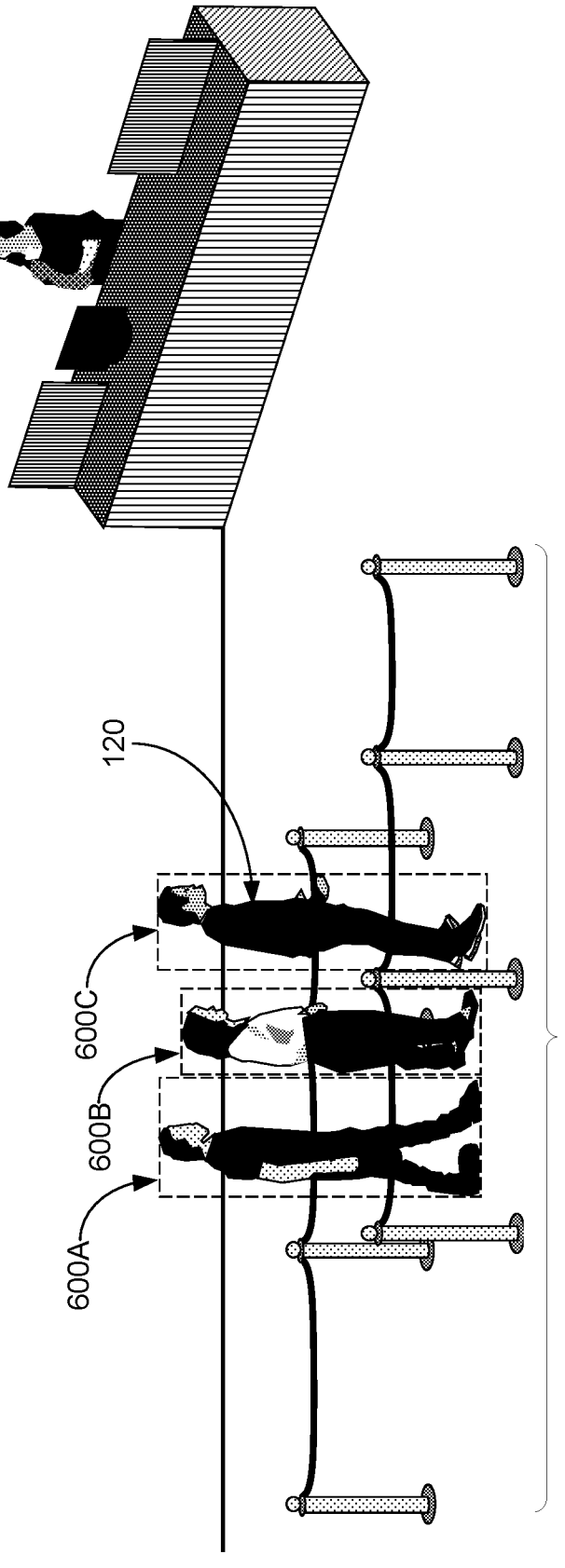
FIG. 6 is an annotated version of the example environ-ment of FIG. 1 showing bounding boxes around objects as may be identified by the software application of FIG. 5.

An example of how bounding boxes may define the locations of objects is provided in FIG. 6. FIG. 6 shows a version of the example environment 100 in which additional people have joined the line in the queue area 110. Bounding boxes 600A, 600B and 600C are shown around each of the people in the line. The bounding boxes 600A, 600B and 600C may correspond to bounding boxes such as may be an output of the object detection model 510.

Returning to consideration of FIG. 5, the object detection model 510 performs two tasks, objection localization and object classification. In the first task, the image is analyzed to detect parts of the image that contains distinct objects, thereby creating region proposals. Region proposals identify regions such as may correspond to a detected object (i.e., a person). This first stage of image analysis is called object detection. In the second task, a pass over the image is performed in order to determine whether objects are detected in the proposed region. This second stage is called object classification. The output of the object detection model 510 (and the second stage) is bounding boxes corresponding to the regions of those of the region proposals in which a person is detected by the second pass.

Such a two-stage analysis of images for object localization and classification may be performed using a variety of techniques. For example, a convolutional neural network (CNN) may be employed that processes the series of images 540 by learning hierarchal representations of the input. This may be performed in two passes over each image of the series of images 540, with each pass corresponding to one of the above-discussed stages. Alternatively, object detection and objection classification may be performed in a single pass over the image. Conveniently, performing detection and classification in a single pass over the image may increase the speed of computation and of object localization and classification as compared to a multi-pass approach. Notably, such a single pass approach may allow analysis by the object detection model 510 to be performed in real-time or near real-time on hardware as may not have sufficient computational resources to provide real-time or near real-time performance using a multi (e.g., two) pass approach. Other implementations may employ other numbers of passes, e.g., more than one or two.

Existing machine-learning based object detection models may be adapted to serve as or as a component of the object detection model 510.

A first example model as could potentially be employed in some implementations of the object detection model 510 is described in "Fast R-CNN" by Ross Girshick dated 27 Sep. 2015 [available from https://arxiv.org/pdf/1504.08083.pdf], the contents of which are herein incorporated by reference in their entirety.

A second example model as could potentially be employed in some implementations of the object detection model 510 is described in "Faster R-CNN: Towards Real-Time Object Detection with Regional Proposal Networks" by Shaoqing Ren, Kaiming He, Ross Girshick, and Jian Sun dated 6 Jan. 2016 [available from https://arxiv.org/pdf/1506.01497.pdf], the contents of which are herein incorporated by reference in their entirety.

A third example model as could potentially be employed in some implementations of the object detection model 510 is described in "SSD: Single Shot MultiBox Detector" by Wei Liu, Dragomir Anguelov, Dumitru Erhan, Christian Szegedy, Scott Reed, Cheng-Yang Fu, and Alexander C. Berg dated 29 Dec. 2016 [available from https://arxiv.org/pdf/1512.02325.pdf], the contents of which are herein incorporated by reference in their entirety.

A fourth example model as could potentially be employed in some implementations of the object detection model 510 is described in "YOLO9000: Better, Faster, Stronger" by Joseph Redmon and Ali Farhadi dated 25 Dec. 2016 [available from https://arxiv.org/pdf/1612.08242.pdf], the contents of which are herein incorporated by reference in their entirety.

In each case, an object model, whether it is a model based on or selected from amongst known models including, potentially the above example models, or instead is an entirely new model (which could be an adaptation, modification, and/or improvement of an earlier model), may represent a trade-off between accuracy of prediction and the computation required to perform a prediction. For example, the applicant employed the model disclosed in "YOLO9000: Better, Faster, Stronger" referenced above (hereinafter "YOLOv2") in a proof-of-principle prototype related to the subject matter of the present application. Notably, the YOLOv2 model may be considered advantageous insofar as it performs localization and classification within a single pass. Conveniently, the YOLOv2 single pass mode of operation may provide a greatly increased speed of computation as compared to multi-pass models with accuracy only slightly below some multi-pass models. As such, an implementation of the object detection model 510 employing or based on a single-pass object detection model like YOLOv2 may be particularly suited to providing reasonably accurate object detection in real time or near real-time such as may, for example, be required or desired in order to determine wait times based on images of a queue area (such as the series of images 540) in either real time or near real-time.

Object models may be reliant on a high-quality, labeled dataset of images from the domain in which the model is to be deployed. Such a dataset may be employed, for example, in training or validating an implementation of the object detection model 510 that is based on a general object detection model such as, for example, one of the foregoing example models. For example, such a dataset may be employed to, in effect, customize a model such as, for example, one of the foregoing example models, in order to arrive at the object detection model 510 and/or a sub-component thereof. It may be that a data set with a diverse set of people, including, for example, people of different sizes and with different styles of clothing, is employed. Such a data set may, for example, be intended to reflect the diversity of persons such as may wait in a queuing area. Notably, employing a data set from the same or a similar vantage point to that of the series of images 540 (i.e., generated from a vantage point similar to that of the camera 210) for training and/or validation of an object detection model may assist in providing an object detection model that is accurate and/or robust.

As mentioned above, a data set may be employed in training and/or validation of the object detection model 510 and/or sub-components thereof. In one example, such a data set may be partitioned into splits, with portions thereof employed as training and validation sets respectively such as for, for example, use with cross-validation techniques such as, for example, k-fold cross-validation.

The identity model 520 tracks objects—in particular, objects corresponding to people detected by the object detection model 510—across sequential ones of the series of images 540. In this way, the identity of objects (people) may be persisted as they move through time and space. (Notably, such movement may be reflected in the series of images 540.)

The identity model 520 receives the bounding boxes output by the object detection model 510 and delineates between those bounding boxes corresponding to objects matching objects in a previous frame and those bounding boxes corresponding to a new object. The output of the identity model 520 is a reclassification of the bounding boxes provided by the object detection model 510. In particular, each of the bounding boxes provided by the object detection model 510 may be associated with a corresponding particular unique identifier (which may, for example, be a unique integer value). In particular, objects in later images corresponding to an object from one or more earlier images (i.e., objects in a later frame matching objects in earlier frames) are assigned the same unique identifier as that object. In this way objects (and therefore people) may be tracked over time via the series of images 540. Put differently, in this way, the identity of people may be persisted across sequential frames (images) of the series of images 540. In addition to tracking images from earlier frames, the identity model 520 also assigns new objects a new unique identifier upon first appearance. This new unique identifier then becomes the identifier assigned to matching objects in subsequent frames (images) of the series of images 540. In some embodiments, the unique identifiers may be referred to as "identity ids".

Referring again to FIG. 6, the identity model 520 could, for example, correlate the bounding box 600C (which corresponds to the person 120) with bounding boxes corresponding to objects matching the person 120 in earlier frames as the person 120 moves through the queue area 110 and, more broadly, through the example environment 100.

Returning to discussion of FIG. 5, the identity model 520 may operate in a variety of manners. In other words, the above-mentioned delineation may be performed in a variety of manners. For example, movement patterns of objects may be analyzed in order to generate a prediction for where that object will be located in a subsequent image (frame). It may then be checked whether there is an object in such a subsequent image at the predicted position. If so, such an object may be considered a match to the object from the earlier image. In another example, a model such as, for example, a machine-learning model, may be employed to extract features of an object from an image. Examples of features include body shape and clothing color and/or style/shape. The extracted features may be considered a "fingerprint" for that object. Subsequent frames may be analyzed to determine if an object matches the such a "fingerprint" for an object from an earlier image. If so, the object may be considered a match to the object from the earlier image. In some cases, various techniques may be employed in combination. For example, depending on factors such as, for example, the number of frames of prior detection for a particular object and the amount of occlusion of that object, a match may be detected based on the former or the latter technique (or both).

The foregoing is an example of how the identity model 520 may operate. Other manners of operation of the identity model 520 could, however, potentially be employed to similar effect. In some embodiments, a known object tracking algorithm may be employed in implementing the identity model 520. For example, in the above-mentioned proof-of-principle prototype, the applicant employed, to beneficial effect, an algorithm based on "Simple Online and Realtime Tracking with a Deep Association Metric" by Nicolai Wojke, Alex Bewley, and Dietrich Paulus dated Mar. 21, 2017 [available https://arxiv.org/pdf/1703.07402.pdf], the contents of which are incorporated by reference in their entirety.

As mentioned above in the context of the object detection model 510, a data set may be important to the training and/or validation of the identity model 520. For example, a labeled dataset of image sequences (e.g., videos) of people with those people identified and reidentified across images (e.g., across frames) may be employed. Such a data set may, as mentioned above in the context of the object detection model 510, include a diverse set of people, including, for example, people of different sizes and with different styles of clothing, such as may, for example, reflect the diversity of persons such as may travel through in a queuing area. Notably, in some embodiments, a suitably annotated data set may be employed as the data set for developing both the object detection model 510 and the identity model 520. Alternatively, there may be commonality between the data sets such as, for example, overlap between some or all of the images of the data sets. In any event, a data set from the same or a similar vantage point to that of the series of images 540 may assist in providing an identity model that is accurate and/or robust.

The application model 530 receives information about the identified objects from the identity model 520. Additionally, the application model 530 may receive the series of images 540. The application model 530 provides logic that utilizes the output of the identity model 520 in order to perform a specific function and to provide output. For example, the application model 530 may provide one or more wait times.

In some implementations, the application software 410 may include one or more additional modules (not shown). It may be the some of that functionality of the modules described above may be provided by way of one or more additional modules (i.e., the functionality described above as provided by a particular module may be split across multiple modules and/or combined in with one or more other modules).

Example logic as may correspond to an example implementation of the application model 530 will now be described.

The application model 530 may be configured to determine wait times for persons entering the queue area 110 (FIG. 1) of the example environment 100. The queue area 110 may be defined relative to the series of images 540 (and/or to the bounding boxes and/or other object information) in a variety of manners. For example, if it is assumed that the camera 210 is stationary, then a bounding box may be defined that, in each of the series of images 540, encompasses the queue area 110 without including any extraneous portions of the example environment 100 to any substantial degree. The identity model 520 may provide bounding boxes and associated identifiers to the application model 530. The application model 530 may then discard or ignore bounding boxes that fall outside the bounding box encompassing the queue area 110. By contrast, for objects with bounding boxes falling inside the bounding box encompassing the queue area 110, a timestamp may be logged in association with the identity id of the object upon first detection. In other words, the time that an object corresponding to a given person first enters the queue area 110 may be logged (e.g., in association with the corresponding unique identifier). Then, once a person is no longer detected such as, for example, after a timeout (e.g., 30 seconds) elapses without detection of the person they are treated as having left the line. Notably, allowing such a timeout before detection may provide for objects not being detected (e.g., due to occlusion or a failure to match) but being detected again in subsequent ones of the series of images 540 (FIG. 5) within a short period of time. A timestamp of the last detection of that person considered to have left the line may be compared to the logged timestamp for that same person (unique identifier) in order to determine a wait time for that person (i.e., how long that person was in the queue). Conveniently, because this method of determining wait times does not require extensive analysis of the series of images 540 beyond processing by the objection detection model 510 and the identity model 520, it may be particularly suited to providing real time or near real-time performance without requiring extensive computational resources.

In some embodiments, object identifiers known or identified to be associated with staff or employees may be ignored for computing of wait times and the like. Object identifiers associated with staff may be determined in a variety of manners. For example, object identifiers associated with objects (i.e., people) remaining in the example environment 100 for a prolonged period (e.g., as may correspond to a work shift) may be deemed associated with staff. In another example, object identifiers associated, in at least some images, with objects located in a staff-only area (e.g., behind the desk in the service position 130 (FIG. 1)) may be considered to correspond to staff.

A current or average wait time for the queue area 110 may also be determined based on the wait time for particular people. For example, the wait times for the last n people (e.g., n could be set to 5) to leave the line (e.g., who were last no longer detected after the above-mentioned timeout) or for all of the people who left the line within a defined period (i.e., a time window such as, for example, a 10-minute interval), may be averaged to produce a current wait time. The average could, for example, be a simple mean or could be weighted in some fashion such as, for example, to assign greater weight to those who most recently left the line.

Other statistics may also be determined based on the foregoing. For example, the computer system 200 may, based on the objects detected in a particular one or in recent ones of the series of images 540, determine a current number of people waiting in line. For example, such a determination may consider all people who have been detected in the most recent one of the series of images 540 and/or all people who have been detected in any recent ones of the series of images 540 within a timeout period similar to the use of a timeout as was discussed above. Notably, such a number of waiting people may, for example, be determined by the computer system 200 based on the number of unique object identifiers occurring in any of the last n ones of the series of images 540 and/or in ones of the series of images 540 that were received within the timeout period or other interval.

Other methods of determining wait times based on output of the identity model 520 may, additionally or alternatively, be employed. For example, referring to FIG. 7, the queue area 110 may be divided conceptually into regions. First, the queue area 110 may have an entrance area 700 through which persons enter the queue area 110 to wait for service. Second, the queue area 110 may have an exit area 702 through which persons exit the queue area 110 such as to receive service at the service position 130. For example, a person may exit the queue area 110 through the exit area 702 to travel to a service area 710 proximate the service position 130, with the person remaining in the service area 710 while they receive service. Monitoring of wait times may then determine wait times for a person based on a time associated with one of the series of images 540 (FIG. 5) in which an object associated with an identifier for that person enters the queue area 110 through the entrance area 700 and a time associated with another, later one of the series of images 540 in which another object associated with the same identifier exits the queue area 110 through the defined exit area 702. Monitoring wait times using defined entrance and exit areas may improve accuracy or reliability of wait time measurement such as, for example, as compared to the above-described other method. For example, if the queue area 110 is crowded, according to the previously described method of determining wait times, a person may be erroneously considered to have left the line to receive service if objects matching them are not detected for the timeout period (e.g., if the person is occluded by another person for a timeout period). By contrast, by monitoring the entrance area 700 and exit area 702, a person may be considered to only have left the line when corresponding objects exit the queue area through the defined exit area (the exit area 702). It may be that such defined entrance and exit areas also allow wait times for receiving service to be determined more accurately. For example, persons who leave the line before receiving service may be expected to exit the line through the sides of the queue area 110 or through the entrance area 700. By only measuring wait times for persons/objects exiting the queue area 110 through the exit area 702, wait times of those actually receiving service may be measured. Notably, limiting measures of average or current wait time to wait times so measured may improve accuracy of such values. In some embodiments, only wait times for objects that proceed to the service area 710 (i.e., after passing through the exit area 702) may be considered. Conveniently, because this method of determining wait times still does not require extensive analysis of the series of images 540 beyond processing by the objection detection model 510 and the identity model 520, it may be suited to providing real time or near real-time performance in determining wait times.

As mentioned above, an average wait time may be determined. For example, where the wait times are determined with reference to defined entrance and exit areas, an average wait time may be determined for a group of people that enters and exits the queue area 110 through the defined entrance and exits areas such as, for example, with the people in the group corresponding to respective identifiers associated with objects entering the queue area 110 through the entrance area 700 and leaving the queue area through the exit area 702. An average wait time may then be calculated based on wait times for the group. Additionally or alternatively, a current wait time may be determined such as, for example, by limiting the group size (latest n members, first-in first-out) and/or by limiting the group to those that entered and/or left the queue area 110 within a defined period.

Potentially, only wait times for those that dwell in the service area 710 for a defined period (e.g., 30 seconds) may be considered so as to further restrict wait time measures to those who actually received service. Conveniently, this may yet further improve accuracy of measured wait times.

Figure 8:
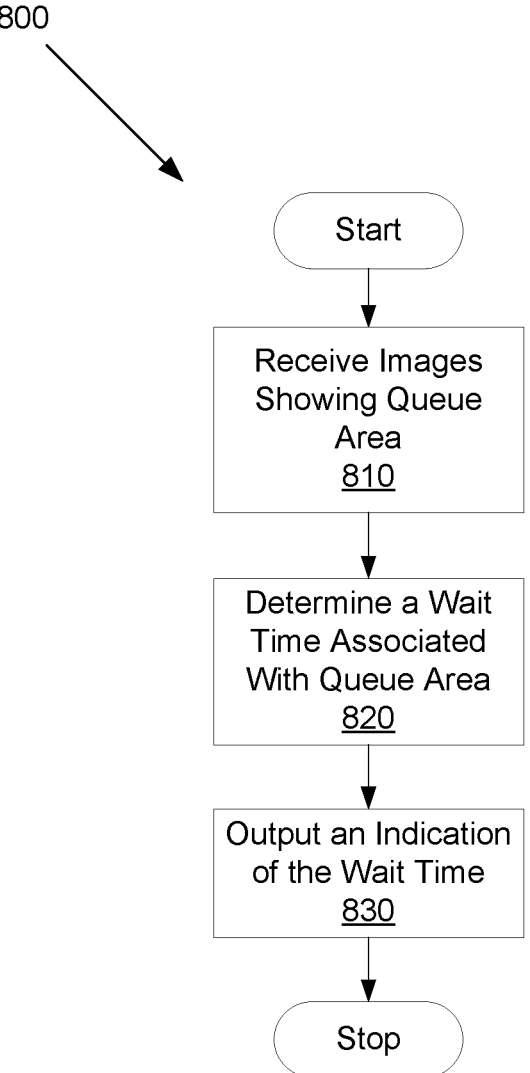
FIG. 8 is a flowchart showing operations performed by the computing device of FIG. 3 in determining and outputting a wait time.

Example operations as may be performed in determining a wait time will now be summarized with reference to a flowchart 800 of FIG. 8. Operation 810 and onward are performed by the processor 310 of the computer system 200 executing the application software 410.

At the operation 810, images showing a queue area are received. For example, signals corresponding to the series of images 540 (FIG. 5) showing the example environment 100 (FIGS. 1 and 6) over time may received. As discussed above, the example environment 100 includes the queue area 110. Further, it may be considered, as explained above, that the queue area 110 has defined entrance and exit areas, namely the entrance area 700 (FIG. 7) and the exit area 702.

Following the operation 810, an operation 820 is next.

At the operation 820, a wait time associated with the queue area 110 is determined. Wait times may, for example, be determined in manners described above.

Figure 9:
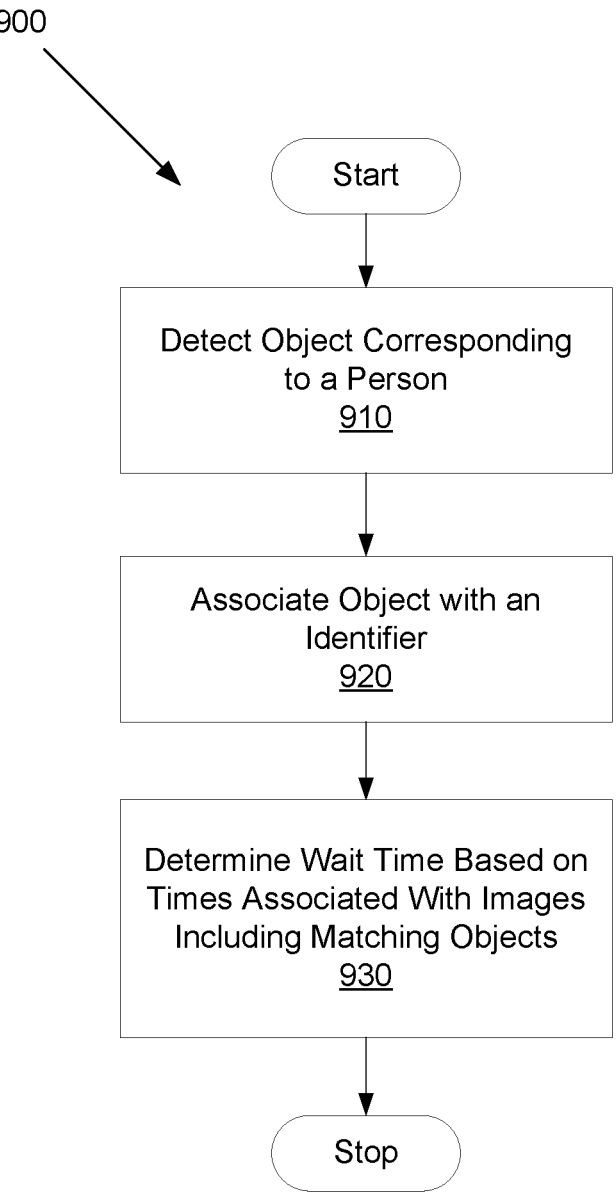
FIG. 9 is a flowchart showing operations as may be performed by the computing device of FIG. 3 as a part of performing one of the operations of FIG. 8.

Example operations as may be performed by the processor 310 computer system 200 in determining a wait time (e.g., in performing the operation 820) will now be described with respect to a flowchart 900 of FIG. 9. Operation 910 and onward are performed by the processor 310 of the computer system 200 executing the application software 410. Operation 910 and onward may be considered a part of the operation 820.

At the operation 910, an object corresponding to a person is detected in one of the series of images 540 (FIG. 5). In other words, in a first one of the images there may be detected (e.g., by way of the object detection model 510 (FIG. 5)) a location of a first object corresponding to a person.

Following the operation 910, an operation 920 is next.

At the operation 920, an identifier is associated with the first object (e.g., by way of the identity model 520 (FIG. 5)). The identifier uniquely identifies the first object in a first one of the series of images 540 (FIG. 5). The identifier also uniquely identifies objects matching the first object in later ones of the series of images 540.

Following the operation 920, an operation 930 is next.

Figure 7:
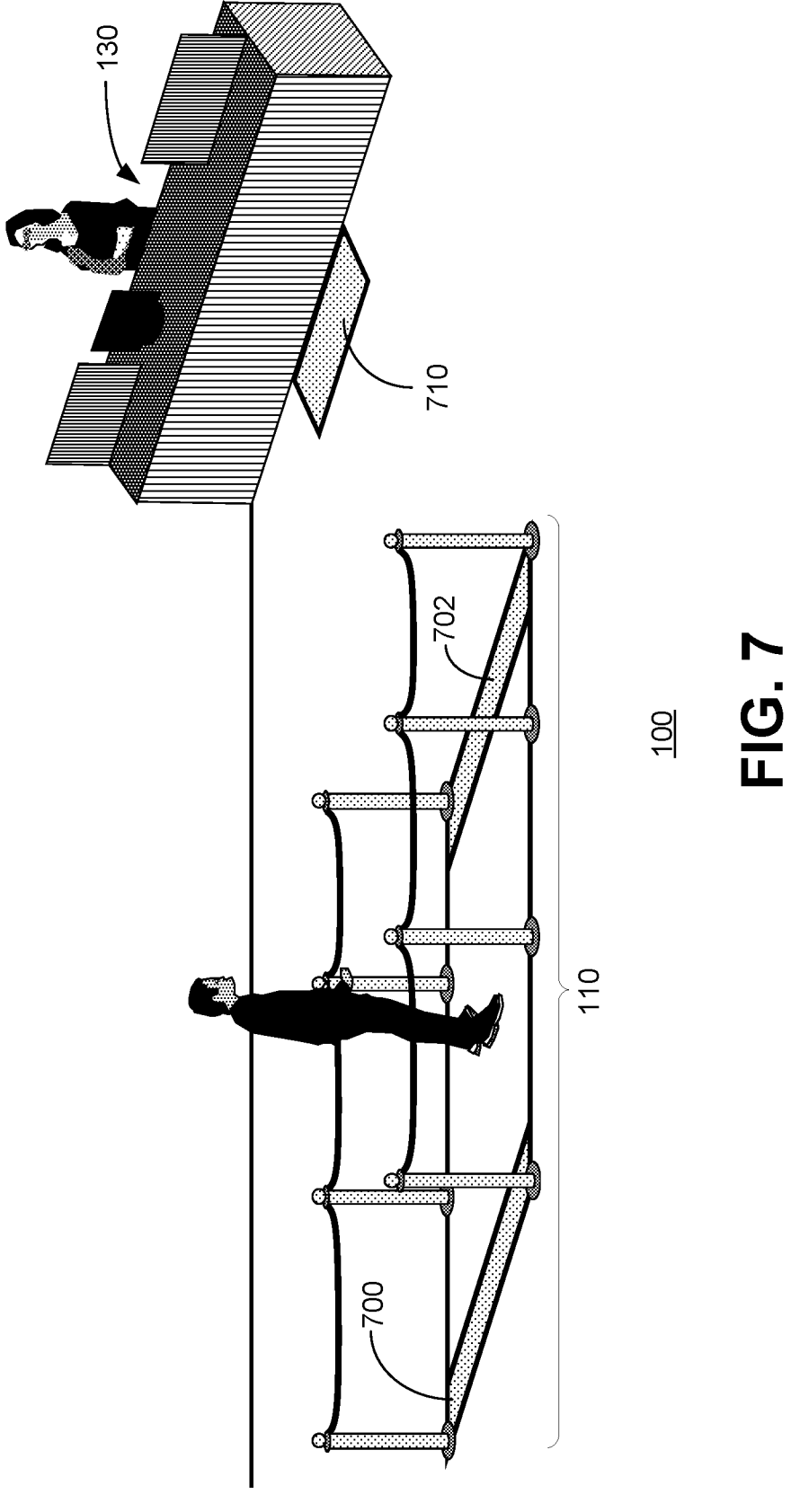
FIG. 7 is an annotated version of the example environ-ment of FIG. 1 showing areas in the environment as may be monitored by the software application of FIG. 5.

At the operation 930, a wait time is determined for the person based on times associated with a second one of the series of images 540 (FIG. 5) in which a second object associated with the identifier (i.e., matching the first object) enters the queue area 110 (FIGS. 1 and 6) through the entrance area 700 (FIG. 7) and a third, later one of the series of images 540 (FIG. 5) in which a third object associated with the identifier (i.e., also matching the first object) exits the queue area 110 through the exit area 702 (FIG. 7).

In this way a wait time associated with the queue area 110 (FIGS. 1 and 6), namely a wait time for the above-discussed person, may be determined.

Returning to FIG. 8, following determination of the wait time associated the queue area 110 at the operation 820, an operation 830 is next.

At the operation 830, an indication of the wait time determined at the operation 820 is output. As further described below, indications of wait times may be output in a variety of manners. For example, such an indication may be sent by the computer system 200 to one or more interested parties via a network such as, for example, by way of the I/O interface 330 when the I/O interface is or includes a communication module as described above.

Now, returning to consideration of the application model 530 of FIG. 3, it is noted that objects traveling through the service area 710 may be considered. For example, in some embodiments, it may be determined when an object associated with a particular person/identifier enters and exits the service area 710. By identifying one of the series of images 540 in which such an object enters the service area 710 and another, later one of the series of images 540 in which another object associated with that same identifier (and person) exits the service area 710, a service time for the person may be determined based on the difference between the times associated with each of those images.

In some embodiments, one or more additional service areas (not shown) may be provided. For example, additional service areas may correspond to additional service positions ("wickets"). Services times may also be determined for people entering and exiting the additional service areas. In a particular example, service times may be determined by the computer system 200 in association with objects entering and exiting the additional service areas. Indications of service times (current, average, per person) may be output by the computer system 200.

Such additional service times may then also be considered such, as for example, in determining an average service time. For example, an average service time for a defined period may be further based on service times for people corresponding to identifiers associated with objects entering and leaving the additional service areas during a defined period. In a particular example, average service time may be determined by the computer system 200 for a group of people that enters and exits a service area (i.e., one of the additional service areas) such as based on the people in the group corresponding to respective identifiers associated with objects entering and leaving such a service area. An average service time may then be calculated based on service times for the members of the group. Additionally or alternatively, a current service time may be determined such as, for example, by limiting the group size (latest n members, first-in first-out) and/or by limiting the group to those that entered and/or left the service area 710 within a defined period.

In some cases, such as, for example, where more than one service position is provided, some service positions (and, hence, some service areas) may be closed during particular intervals. For example, a particular service position may be closed during a defined interval used for determining an average wait, service, and/or visit time (visit time being based on a combination of wait and service time such as, for example, by summing). It may be that, in some cases, closed service positions should be opened if the average wait, service, and/or visit time exceeds a control threshold. In a particular example, if it is detected (such as by the computer system 200) that the current visit time has exceeded a threshold, then an indication may be sent that one of the service areas (i.e., a closed one of the service areas) should be opened (e.g., in an effort to reduce wait times). For example, the computer system 200 may send such an indication such, as for example, to one or more electronic devices (e.g., smartphones) associated with staff and/or managerial staff. Additionally or alternatively, it may be detected by the computer system 200 based on the series of images 540 that customers are abandoning the queue (e.g., by corresponding objects exiting the queue area 110 (FIGS. 1 and 6) other than through the exit area 702 (FIG. 7)) and a threshold number of such abandonments (e.g., within a defined time window) may be trigger the computer system 200 to determine that one or more additional positions should be opened (and to send one or more indications as described above).

In addition or as an alternative to opening additional service positions responsive to conditions such as, for example, those described above (e.g., wait time, abandonments, etc.), in some embodiments an indication may be sent by the computer system 200 to trigger one or more staff members to intervene in the line. For example, such an indication may be sent by the computer system 200 to an electronic device of one or more staff members so that such a staff member may inquire as to the service required by a particular waiting customer and may, potentially, redirect that customer to another channel where faster service is possible. For example, where the example environment 100 corresponds to a bank branch, the customer could be redirected to an automated teller machine (ATM) and/or to mobile or telephone banking. Notably, such redirection may allow staff to identify customers who are using in-person service due to a lack of familiarity and/or comfort with such alternate channels and staff may offer training or instruction on such channels. Conveniently, in this way, customer satisfaction may be increased and/or customers may be redirected away from consuming in-person service resources/waiting in line in future for simple transactions that can be completed via other channels.

Notably, where a current service time has been determined it may be employed in order to provide an estimate of expected wait time. For example, the current service time may be multiplied by the number of people currently in line in order to arrive at an estimated of expected wait time. Conveniently, such an estimate may provide an estimate of expected wait time reflective of current staffing levels (i.e., which service areas are open). In another example of determining an expected wait time, the computer system 200 may consult historical information about service times or wait times with a number of open service areas and/or a number of people in line (i.e., as previously detected by the computer system 200 and recorded in some storage) and may employ such data in provided an expected wait time. For example, past wait times and/or service times for customers that were services under similar conditions may be combined (e.g., averaged) in order to determine an estimated current wait and/or service time. In some embodiments, such past wait times and/or service times may be extracted from data stored in association with transaction data as further described below.

Consistent with the foregoing output from the application model 530 may include, for example, one or more wait times, an average or current wait time, one or more service times, an average or current service time, one or more visit times (wait+service time) and/or an average or current visit time.

Indications of such outputs may be provided. In some embodiments, the outputs may be published in a variety of manners. For example, as mentioned above, they may be sent by the computer system 200 to interested parties such as, for example, by way of a computer network. For example, the computer system 200 may send such an indication using a communications module. In some embodiments, one or more images of the series of images 540 may be provided by the computer system 200 as a part of output. For example, wait time information may be overlaid on an image of the queue area 110 (FIG. 1) by the computer system 200 and the resultant image may be provided as output.

For example, wait time information may be made available via a mobile application or web application. In a particular example, wait times for different locations may be provided via a location finder such as, for example, for businesses with more than one branch or location. Notably, wait, service and/or visit times could be considered in identifying a nearest or most convenient branch for a user. For example, a mobile application may allow a user to identify (such as, for example, based on a location of the mobile device) a most convenient branch or location of the business to visit and may consider visit times as a factor in selecting this most convenient branch. In a particular example, a recommendation of a location to visit to receive fastest service may be provided by a mobile application based on current service or visit times in locations together with the expected time for the user to travel to each location. The location with the lowest combination (e.g., sum) of current average visit time and expected travel time to reach it may be considered the most convenient branch. Alternatively, in some embodiments, trends in wait, visit, and/or service times over time may be considered and the recommendation may be based on a projected wait, service, and/or visit time. Notably, using projected times may allow more accurate recommendations to be provided if the expected travel times are long and, therefore, wait and/or service conditions in the location may change (e.g., due to changing volumes of customer arrivals and/or staffing levels) before the customer arrives at the location after traveling.

In some cases, wait, service and/or visit times (e.g., averages of one or more of the foregoing) may be used in managing staffing levels in a location. For example, where such levels exceed a threshold, it may be determined (such as by the computer system 200) that additional service locations should be opened. Notably, this may include calling in additional staff and/or triggering staff to shift from other duties (e.g., back office functions) to servicing the queue. For example, an indication may be automatically sent by the computer system 200 to a mobile device associated with a particular staff member to trigger them to shift to their duty and/or to report for work. In some embodiments, wait, service and/or visit time data may be an input to building a staffing model for a location. For example, historical wait, service and/or visit time data collected (such as by the computer system 200) according to the subject matter of the present application may be employed a computer system (e.g., the computer system 200) to determine projected staffing needs in a location. Once a projected staff need is determined, in some embodiments, it may then be provided by the computer system to staff members (e.g., by way of a notification to their respective mobile devices) such as, for example, in the form of a work schedule.

In some cases, providing service to a person (e.g., at the service position 130 (FIG. 1)) may involve accessing another computer system (not shown). For example, the service person 140 (FIG. 1) may use one or more computing devices such as, for example, to access information or to initiate actions further to providing service to the customer. Notably, such use of a computing device may generate one or more transactions, a record of which (and/or of the effects of which) may be stored in a transaction processing system (a computer system). Where such a transaction processing system stores transactions associated with providing service at the service position 130 (e.g., to a customer in the service area 710), each of those transactions may have an associated time and an associated account. This information may be correlated by a computer system such as, for example the computer system 200 or the above-mentioned transaction processing system, with information collected according to the subject matter of the present invention. For example, the wait time, service time, and/or visit time of a particular detected object (i.e., of a person) that was in that service area may be associated with an account based on transactions having been performed in association with that service area (e.g., using a terminal or other computing device associated with the service position 130 and/or the service person 140) during a time window defined by times associated with that object entering and leaving the service area. For example, information like, for example, the wait time and/or the service time, may be associated with an account based on ones of the transactions stored by the transaction processing system having a time falling within a time window defined by times associated with images corresponding to the object entering and leaving the service area. Alternatively, where there is an identification step associated with providing service, the association may be based on the object that was in the service area during that step. For example, where the example environment 100 corresponds to a bank branch, a user may identify themselves at the beginning of a transaction by swiping or inserting a card and/or entering a personal identification number (PIN) such as, for example, using a customer card terminal (not shown). Conveniently, in this way, information determined from the series of images 540 such as, for example, wait, service, and/or visit times may be associated with an identified person/account. Notably, such associating does not require identification of the person receiving service directly from the series of images 540 (e.g., using facial recognition). Avoiding the using of such image-based person identification techniques may avoid or mitigate privacy concerns as compared to if they are employed. More broadly, identifying people appearing in images by correlating the image and, in particular, images showing time in a service area with transaction data for that same time period may be more robust than identification based on images (e.g., using facial recognition) which can be prone to errors.

The ability to associate information such as, for example, wait, service, and/or visit times for a person with an identified person and/or account may allow particular services to be automatically provided. For example, where it is determined (e.g., by the computer system 200 and/or by the above-mentioned transaction processing system) that a customer encountered a significant wait before receiving a particular service, an indication could be provided to the customer (e.g., by sending a message or other indication to a contact associated with the account) suggesting use of different channel to avoid waiting for service in future. In a particular example, where the example environment 100 corresponds to a bank branch, the customer could be provided such an indication by a backend banking computer system if they waited to perform a transaction that could have, alternatively, been performed using telephone or mobile banking and/or using an automated teller machine (ATM). In a particular example, such indications may be sent (e.g., by the computer system 200 or by the abovementioned backend banking computer system) to a mobile or other device of the customer (e.g., by way of an email, and/or a short message service (SMS) message and/or for display by a mobile or web banking application). In some embodiments, such an indication may be sent (e.g., by a computer system) if a customer is detected to have repeatedly used in-person service for a particular transaction type that can be performed using another channel and the customer has repeatedly had to wait (e.g., at least a threshold wait time each time) for in-person service. For example, in the case of a banking, a customer may be sent an indication if they visit a branch repeatedly to pay bills and had to wait in line to do so each time.

In another example, it may be determined by a computer system based on the transaction data (e.g., by the computer system 200 and/or the above-mentioned transaction processing system) that the same person visited the same location more than once during the same period. This, for example, may allow information about return visits to be extracted from transaction data such as, for example, to identify transaction types associated with multiple visits such as, for example, to complete an overall task. This, in turn, may allow training and/or work process streamlining targets to be identified.

Furthermore, as noted above, the associated accounts may be of various types. Trends or information may be determined by a computer system (e.g., the computer system 200 and/or the above-mentioned transaction processing system) based on the type of customer/account. For example, in the case of a bank branch, wait, service, and/or visit times could be determined by a computer system for business and personal banking customers by considering the relevant times as associated with particular transactions associated accounts of that type. In a particular example, an average visit time may be determined for accounts of a particular type (e.g., business accounts) such as, for example, during a defined period. Notably such an average visit time may be determined based on wait times and service times associated with accounts associated with transactions associated with providing service during the defined period (for example, by combining wait and service times (e.g., by summing) to arrive at a visit time and then computing an average). In another example, information may be determined or extracted based on the type of the account or the type or type of transactions performed. For example, average service times may be determined by a computer system for particular types of transactions. Potentially, such average service times by transaction type may be further segmented by account type.

Additionally or alternatively, as the identity of the service person 140 may be associated with the transactions (e.g., because they have to login to a terminal at the service position 130), a time for the service person 140 to perform a particular transaction type and/or to service particular types of accounts may be determined by a computer system such as, for example, the computer system 200 and/or the above-mentioned transaction processing system. Such information may be aggregated by such as system such as, for example, by type of transaction and could be compared across service people. Such a comparison may provide a basis for performance management and/or coaching. For example, a service person may be coached if they take too long to perform a transaction or if they take too short of a time (e.g., as this could indicate that steps such as, for example, verification steps, are being skipped). Notably, that a service person is taking too long or to short to perform a transaction may be determined based on aggregated information based on values collected according to the subject matter of the present application. For example, a computer system processing such data may deem a service person to be taking too long or too short if their average service time for a particular transaction time is more than a set number of standard deviations (e.g., 2 standard deviations) from an average transaction time for that service across all service persons (or subset of service persons, e.g., those of similar tenure or seniority). In another example, a service person may be staffed in a role in which they will be required to service particular account types or to assist with particular transaction types either to play to their strengths and/or to provide an opportunity for development. Similar effect may potentially also be achieved by staffing a service person during times when particular transaction types are expected to be common and/or when transaction volumes are projected to originate from a particular type of account(s).

The above discussion involved a series of images 540 captured using a single camera, namely the camera 210. It may, however, be that more than one camera is employed.

Figure 10:
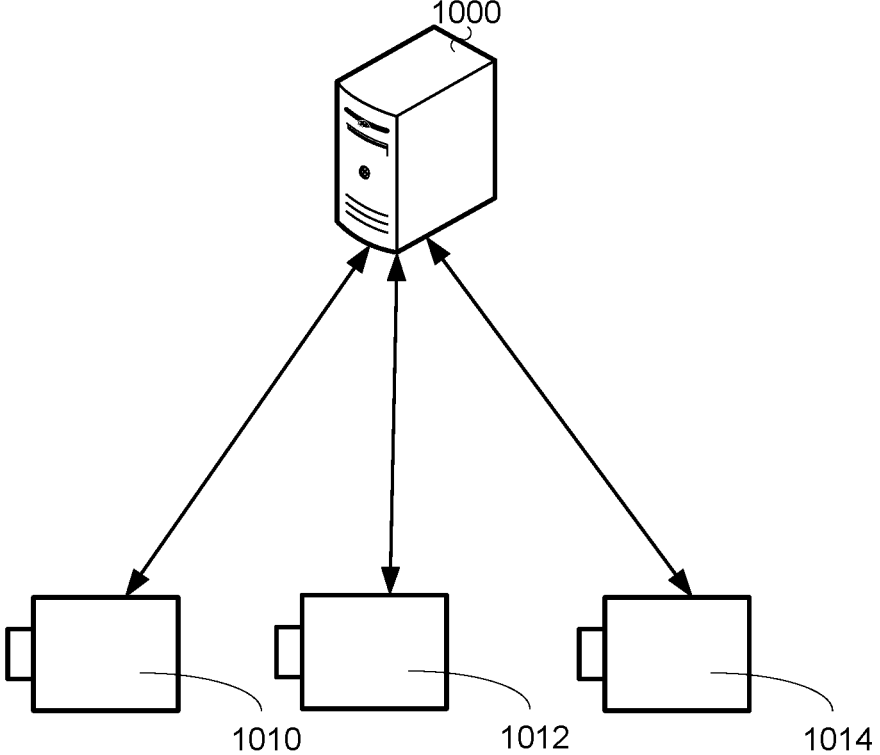
FIG. 10 is a schematic diagram illustrating an operating environment of a second example embodiment.

FIG. 10 is a schematic diagram illustrating an operating environment of such an embodiment.

As illustrated, a computer system 1000 is in communication with more than one camera. In particular, the computer system 1000 is in communication with three cameras—a first camera 1010, a second camera 1012, and a third camera 1014—though this is merely by way of example. For example, it may be that two or more than three cameras could be employed.

The computer system 1000 is a computing device akin to the computer system 200 (FIGS. 2 and 3).

The first camera 1010, the second camera 1012, and third camera 1014 capture images of an environment—e.g., the example environment 100 (FIG. 1). Each of the first camera 1010, the second camera 1012, and the third camera 1014 is akin to the camera 210 (FIG. 2). However, the first camera 1010, the second camera 1012, and the third camera 1014 each have a different view of the environment and provide images of the environment from a different vantage point. In some embodiments, the first camera 1010, the second camera 1012, and the third camera 1014 may correspond, for example, to different cameras monitoring the environment such as, for example, a set of security cameras. Each of the cameras may be synchronized (e.g., using software) so that images from the same moment of time can be associated by the computer system 1000 with the same timestamp. In some embodiments, such synchronization may be based on timestamps as may be provided in association with some or all of the images provided by the first camera 1010, the second camera 1012, and/or the third camera 1014. Additionally or alternatively, it may be that relative times of particular ones of the images provided by the first camera 1010, the second camera 1012, and/or the third camera 1014 are determined based on known frame rate(s) of the camera(s) and those relative times are used in synchronization. For example, such relative times could be used to determine times associated with images for which an associated timestamp was not provided by referencing a timestamp associated with an earlier image and elapsed time since that image as determined based on a number of images received from the camera since that image and a known framerate.

Figure 11:
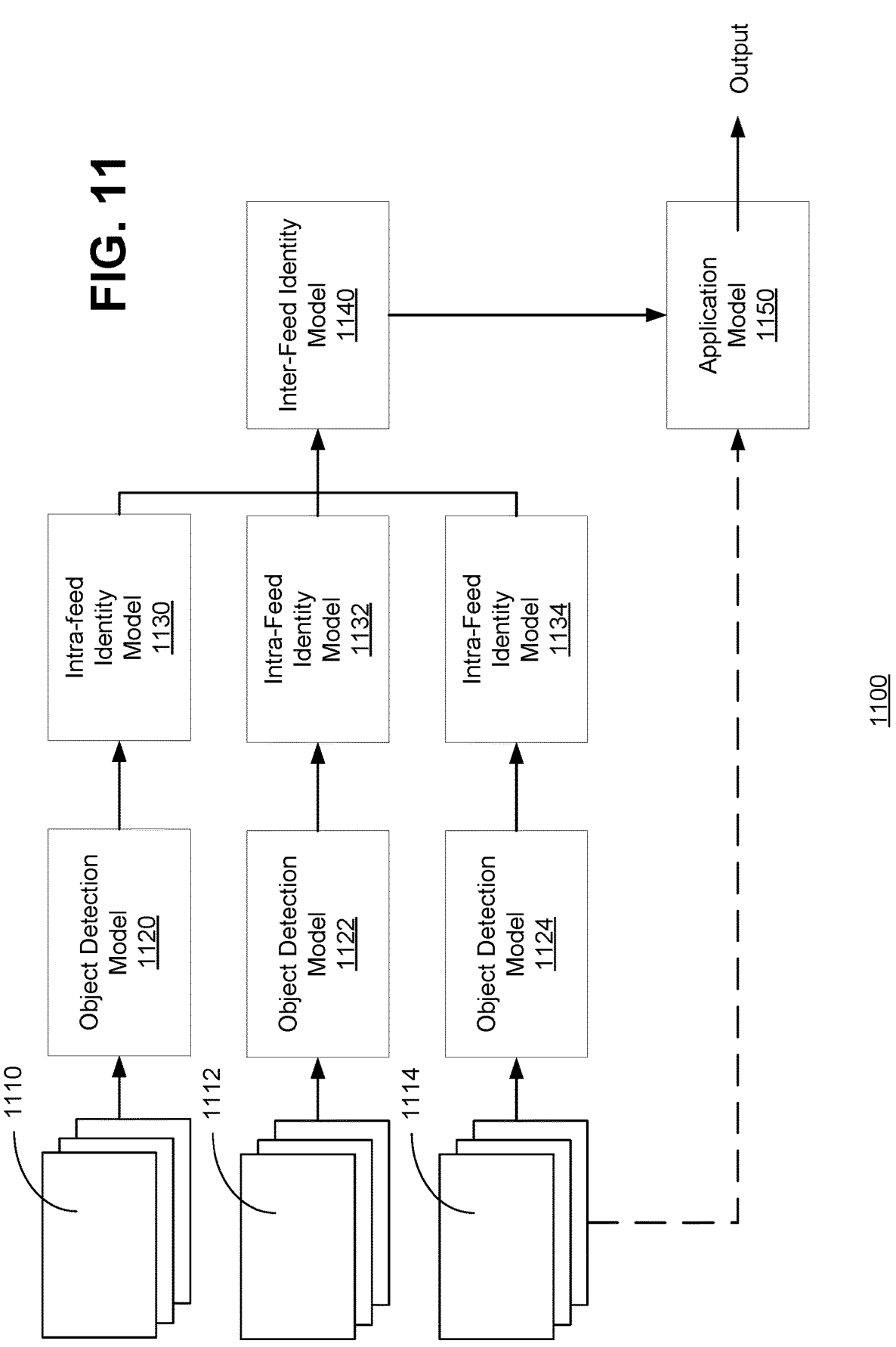
FIG. 11 is a schematic diagram showing modules of a second software application for determining wait times.

FIG. 11 provides a schematic diagram 1100 showing modules of a second software application for determining wait times adapted to receive images from more than one camera. Referring to FIG. 11, a first series of images 1110, a second series of images 1112, and a third series of images 1114 is received over time from the first camera 1010, the second camera 1012, and the third camera 1014, respectively. The first series of images 1110, the second series of images 1112, and the third series of images 1114 are then provided to a first object detection model 1120, a second object detection model 1122, and a third object detection model 1124, respectively.

Each of the first object detection model 1120, the second object detection model 1122, and the third object detection model 1124 is akin to the object detection model 510. In some embodiments, the first object detection model 1120, the second object detection model 1122, and the third object detection model 1124 may provide similar function but may differ such, as for example, having been developed based on data corresponding to the vantage point of the corresponding one of the cameras. For example, one or more of the object detection models may have been trained and/or validated using a data set corresponding to the vantage point of corresponding one(s) of the cameras. In other embodiments, a global object detection model may be developed. Such a global object detection model may then be employed as each of the first object detection model 1120, the second object detection model 1122, and the third object detection model 1124 either without modification or, potentially, after tuning. For example, a global object detection model may be developed using a data set corresponding to the vantage point of one of the cameras and could be employed directly as a corresponding one of the first object detection model 1120, the second object detection model 1122, and the third object detection model 1124 while being subject to further fine-tuning before being employed as the others of the first object detection model 1120, the second object detection model 1122, and the third object detection model 1124.

The outputs of the first object detection model 1120, the second object detection model 1122, and the third object detection model 1124 (e.g., bounding boxes for detected objects corresponding to people) are passed to a first intra-feed identity model 1130, a second intra-feed identity model 1132, and a third intra-feed identity model 1134, respectively. Each of the first intra-feed identity model 1130, the second intra-feed identity model 1132, and the third intra-feed identity model 1134 may perform functions akin to and may have similar outputs to the identity model 520 (FIG. 5) as described above.

The outputs of the first intra-feed identity model 1130, the second intra-feed identity model 1132, and the third intra-feed identity model 1134 are then passed to an inter-feed identity model 1140. The inter-feed identity model 1140 is adapted to match objects present in multiple ones of the feeds (i.e., in image(s) from the first series of images 1110, in image(s) from the second series of images 1112, and/or in images from the third series of images 1114), identify objects previously in images of one of the first series of images 1110, the second series of images 1112, and the third series of images 1114 appearing in later images of another one or more of others of the first series of images 1110, the second series of images 1112, and the third series of images 1114, and also to identify new objects. The output of the inter-feed identity model 1140 is an assignment of a common unique identifier to matching objects not only within each of the first series of images 1110, the second series of images 1112, and the third series of images 1114 (as would be provided by the first intra-feed identity model 1130, the second intra-feed identity model 1132, and the third intra-feed identity model 1134, respectively) but also across the first series of images 1110, the second series of images 1112, and the third series of images 1114. For example, it may be that first sets of unique identifiers consist of unique identifiers that are unique to each of the first series of images 1110, the second series of images 1112, and the third series of images 1114 and that those unique identifiers are then mapped by the inter-feed identity model 1140 to a common set of unique identifiers. For example, it may be that a unique identifier of a given one of such first sets maps to the same unique identifier in the common set of unique identifiers as a unique identifier of another of such first sets that corresponds to objects detected by the inter-feed identity model 1140 to match across one of the first series of images 1110, the second series of images 1112, and the third series of images 1114 and another of the first series of images 1110, the second series of images 1112, and the third series of images 1114.

In a particular example, an inter-feed identity model may employ a CNN to extracted features. Such a model could, for example, be trained using a labeled data set of multiple overlapping cameras. The model may extract a "fingerprint" (e.g., in manners akin to as was described above in relation to the discussion of the identity model 520 (FIG. 5)) for each object found by one of the cameras and then may perform clustering on those "fingerprints". These clusters may then be considered to be the same object and may be assigned the same identifier by the inter-feed identity model 1140.

The output of the inter-feed identity model 1140 (which is akin to the output of the identity model 520 (FIG. 5) discussed above) is provided to the application model 1150. The application model 1150 may be akin to the application model 530 (FIG. 5) discussed above.

Conveniently, the use of multiple cameras may provide enhanced accuracy or reliability as compared to embodiments employing a single camera. For example, such an implementation may be more robust to occlusion of objects such as may, for example, occur if the environment and/or the queue are is crowded and/or due to the obstructed views such as may arise, for example, due to furniture placement. Additionally or alternatively, an implementation of the subject matter of the present application employing multiple cameras may be robust to failure of one or more of the cameras.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
at least one processor; and
a memory module coupled to the at least one processor and storing instructions that, when executed by the at least one processor, cause the computer system to:
receive respective images from a plurality of cameras;
synchronize the plurality of cameras based on respective timestamps associated with the respective images;
pass respective outputs of a plurality of object detection models trained using a data set corresponding to different vantage points of the plurality of cameras, to respective intra-feed identity models to track only within a queue area detected objects by the plurality of object detection models across sequential images of a plurality of series of images received from the synchronized cameras to maintain an identity of the detected objects as the detected objects move through time and space in the queue area;
pass outputs of the respective intra-feed identity models, to an inter-feed identity model that matches respective objects present in the plurality of series of images to identify new objects and identify previous objects in the plurality of series of images and to identify a common identifier across and within each series of the plurality of series of images; and compare a last timestamp of a last detection of a first detected object of the detected objects when the first detected object has left the queue area, to a logged timestamp for the common identifier to determine, in real time and without requiring extensive computational resources, a wait time corresponding to how long the first detected object has been in the queue area.

2. The computer system of claim 1, wherein synchronizing the plurality of cameras is further based on frame rates of each of the plurality of cameras.

3. The computer system of claim 1, wherein the instructions, when executed by the at least one processor, further cause the computer system to:
create, by object localization of the computer system, proposed regions that contain distinct objects; and
determine, by object classification of the computer system, detected objects among the distinct objects in the proposed regions.

4. The computer system of claim 1, wherein the instructions, when executed by the at least one processor, further cause the computer system to:
log, by the computer system, a timestamp of the respective timestamps, for the detected objects with bounding boxes falling inside a bounding box of a queue area in association with a unique identifier of an object first detected in the queue area, and discarding, after a timeout period, those of the bounding boxes falling outside the bounding box of the queue area, and those of the detected objects remaining in the queue area for a prolonged period.

5. The computer system of claim 1, wherein the instructions, when executed by the at least one processor, further cause the computer system to:
determine, by the computer system, respective outputs of the plurality of object detection models that identify bounding boxes for the detected objects.

6. The computer system of claim 1, wherein the instructions, when executed by the at least one processor, further cause the computer system to:
delineate, by the respective intra-feed identity models executed by the computer system, bounding boxes that correspond to specific objects matching those objects detected in a previous frame and bounding boxes corresponding to a new object.

7. The computer system of claim 6, wherein the instructions, when executed by the at least one processor, further cause the computer system to:
reclassify, by the respective intra-feed identity models, bounding boxes provided by the plurality of object detection models, by:
associating the bounding boxes with a unique identifier;
assigning to the detected objects in the sequential images, the unique identifier as the first detected object so that identity of the detected objects is persisted across the sequential images of the series of the respective images;
assigning, upon first appearance of the new object, a new unique identifier to the new object and the matching objects in the sequential images of a plurality of series of images; and
correlating the bounding box of the first detected object with the bounding boxes corresponding to the objects matching the first detected object in earlier frames as the first detected object moves through the queue area and the subsequent images.

8. The computer system of claim 1, wherein the instructions, when executed by the at least one processor, further cause the computer system to train the inter-feed identity model with a convolutional neural network on a labeled dataset of the plurality of cameras.

9. The computer system of claim 1, wherein the instructions, when executed by the at least one processor, further cause the computer system to:

extract a fingerprint for each of the detected objects;
perform clustering on the extracted fingerprints; and
identify the clustered fingerprints as belonging to a same object.

10. The computer system of claim 1, wherein the instructions, when executed by the at least one processor, further cause the computer system to:

correlate, using a terminal associated with a service position in the queue area, a specific time and account associated with the determined wait time of the first detected object, based on transactions performed in association with the queue area during a time window defined by times associated with the first detected object entering and leaving the queue area.

11. The computer system of claim 1, wherein the inter-feed identity model is a machine learning model used to extract features of an object from an image.

12. The computer system of claim 1, wherein the instructions, when executed by the at least one processor, further cause the computer system to:

determine that a transaction associated with the wait time is also associated with providing, by the computer system, a service that could have been accessed through a different channel that does not require waiting in the queue area; and provide, to a device, an indication that the service provided by the computer system is accessible through the device.

13. A computer implemented method comprising:

receiving, by a computer system, respective images from a plurality of cameras;

synchronizing, by the computer system, the plurality of cameras based on respective timestamps associated with the respective images;

passing, by the computer system, respective outputs of a plurality of object detection models trained using a data set corresponding to different vantage points of the plurality of cameras, to respective intra-feed identity models to track only within a queue area detected objects by the plurality of object detection models across sequential images of a plurality of series of images received from the synchronized cameras to maintain an identity of the detected objects as the detected objects move through time and space in the queue area;

passing, by the computer system, outputs of the respective intra-feed identity models, to an inter-feed identity model that matches respective objects present in the plurality of series of images to identify new objects and identify previous objects in the plurality of series of images and to identify a common identifier across and within each series of the plurality of series of images; and comparing, by the computer system, a last timestamp of a last detection of a first detected object of the detected objects when the first detected object has left the queue area, to a timestamp for the common identifier to determine, in real time and without requiring extensive computational resources, a wait time corresponding to how long the first detected object has been in the queue area.

14. The method of claim 11, wherein synchronizing the plurality of cameras is further based on frame rates of each of the plurality of cameras.

15. The method of claim 13, further comprising:

creating, by object localization of the computer system, proposed regions that contain distinct objects; and determining, by object classification of the computer system, detected objects among the distinct objects in the proposed regions.

16. The method of claim 13, further comprising:

logging, by the computer system, a timestamp of the respective timestamps, for the detected objects with bounding boxes falling inside a bounding box of a queue area in association with a unique identifier of an object first detected in the queue area, and discarding, after a timeout period, those of the bounding boxes falling outside the bounding box of the queue area, and those of the detected objects remaining in the queue area for a prolonged period.

17. The method of claim 13, further comprising:

determining, by the computer system, respective outputs of the plurality of object detection models that identify bounding boxes for the detected objects.

18. The method of claim 13, further comprising:

delineating, by the respective intra-feed identity models executed by the computer system, bounding boxes that correspond to specific objects matching those objects detected in a previous frame and bounding boxes corresponding to a new object.

19. The method of claim 18, further comprising:

reclassifying, by the respective intra-feed identity models executed by the computer system, bounding boxes provided by the plurality of object detection models, by:

associating the bounding boxes with a unique identifier;

assigning to the detected objects in the sequential images, the unique identifier as the first detected object so that identity of the detected objects is persisted across the sequential images of a plurality of series of images;

assigning, upon first appearance of the new object, a new unique identifier to the new object and the matching objects in the subsequent images of the series of the respective images; and correlating the bounding box of the first detected object with the bounding boxes corresponding to the objects matching the first detected object in earlier frames as the first detected object moves through the queue area and the subsequent images.

20. A non-transitory computer-readable storage medium storing instructions that, when executed by at least one processor cause the at least one processor to:

receive respective images from a plurality of cameras;

synchronize the plurality of cameras based on respective timestamps associated with the respective images;

pass respective outputs of a plurality of object detection models trained using a data set corresponding to different vantage points of the plurality of cameras, to respective intra-feed identity models to track only within a queue area detected objects by the plurality of object detection models across sequential images of a plurality of series of mages received from the synchronized cameras to maintain an identity of the detected objects as the detected objects move through time and space in the queue area;

pass outputs of the respective intra-feed identity models, to an inter-feed identity model that matches respective objects present in the plurality of series of images to identify new objects and identify previous objects in the plurality of series of images and to identify a common identifier across and within each series of the plurality of series of images; and compare a last timestamp of a last detection of a first detected object of the detected objects when the first detected object has left the queue area, to a logged timestamp for the common identifier to determine, in real time and without requiring extensive computational resources, a wait time corresponding to how long the first detected object has been in the queue area.

* * * * *